United States Patent
Suzuki

(10) Patent No.: US 7,814,884 B2
(45) Date of Patent: Oct. 19, 2010

(54) AIR BYPASS APPARATUS IN FUEL INJECTION APPARATUS

(75) Inventor: Jun Suzuki, Kawasaki (JP)

(73) Assignee: Keihin Corporation, Tokyo (JP)

( * ) Notice: Subject to any disclaimer, the term of this patent is extended or adjusted under 35 U.S.C. 154(b) by 374 days.

(21) Appl. No.: 11/905,773

(22) Filed: Oct. 4, 2007

(65) Prior Publication Data
US 2008/0093480 A1    Apr. 24, 2008

(30) Foreign Application Priority Data
Oct. 4, 2006    (JP) .............................. 2006-272900

(51) Int. Cl.
*F02M 3/00* (2006.01)

(52) U.S. Cl. .............................. 123/339.1; 123/339.27; 123/585; 123/339.14

(58) Field of Classification Search ................. 123/336, 123/337, 339.27, 339.23, 339.1, 585, 327, 123/339.14
See application file for complete search history.

(56) References Cited

U.S. PATENT DOCUMENTS

| | | | | |
|---|---|---|---|---|
| 4,381,747 A | * | 5/1983 | Kobayashi et al. | 123/339.26 |
| 5,325,830 A | * | 7/1994 | Hammer | 123/339.27 |
| 6,446,599 B1 | * | 9/2002 | Nakayasu | 123/339.23 |
| 6,571,766 B2 | * | 6/2003 | Saeki et al. | 123/339.14 |
| 7,302,929 B2 | | 12/2007 | Kondo | |

FOREIGN PATENT DOCUMENTS

| | | |
|---|---|---|
| EP | 1 734 236 A1 | 12/2006 |
| JP | 2007-132234 A | 5/2007 |

* cited by examiner

*Primary Examiner*—Michael Cuff
*Assistant Examiner*—Hung Q Nguyen
(74) *Attorney, Agent, or Firm*—Bacon & Thomas, PLLC

(57) ABSTRACT

To accurately supply idle air without influence of pulsative pressure generated within an intake passage, a lower end surface (21a2) of a bottom portion (21a) of an air control valve (21) is arranged in a contact manner via a closing member (1) toward a locking piece portion (2) fixed to an end portion of a shaft portion (20b) of a slider (20), an annular gap (S2) formed by an inner periphery (21a1) of the bottom portion (21a) and an outer periphery (20d) of the shaft portion (20b) is closed by the closing member (1) arranged in a contact manner on the lower end surface (21a2), and cuts off communication between a space portion (25), which is formed between a tube portion (21b) of the air control valve (21) and the shaft portion (20b), and a lower chamber (12g) of a valve body guide hole facing to the bottom portion (21a).

3 Claims, 6 Drawing Sheets

AIR BYPASS APPARATUS IN FUEL INJECTION APPARATUS

BACKGROUND OF THE INVENTION

1. Field of the Invention

The present invention relates to a fuel injection apparatus in which fuel within a fuel tank is boosted by a fuel pump, and the boosted fuel is injected and supplied to an engine via a fuel injection valve, and more particularly to an air bypass apparatus supplying controlled idle air into an intake passage at a downstream side of a throttle valve while bypassing the throttle valve, at a time of an idling operation of the engine and at a time of an off-idle operation.

2. Description of the Conventional Art

A conventional air bypass apparatus is disclosed in PCT/JP2005/006560 and Japanese Patent Application No. 2005-324824, a whole structure of the air bypass apparatus is disclosed in PCT/JP2005/006560, and a locking structure between a slider and an air control valve is disclosed in Japanese Patent Application No. 2005-32482.

A structure of an air bypass apparatus arranged on the basis of PCT/JP2005/006560 is disclosed in FIG. 8, and will be explained by this drawing.

Reference numeral 10 denotes an air control valve main body in which a motor insertion hole 11 and a valve body guide hole 12 are continuously provided from an upper end surface 10a toward a lower side. An air control hole 13 is open to a side wall 12a of the valve guide hole 12, and a downstream side of the air control hole 13 is open so as to communicate with an inner side of an intake passage 15 passing through a throttle body 14 and an inner side of an intake passage 15a at a downstream side of a throttle valve 16. On the other hand, an air inflow hole 17 is open to a portion near a bottom portion 12b of the valve body guide hole 12, and an upstream side of the air inflow hole 17 is open so as to communicate with an inner side of an intake passage 15b at an upstream side of the throttle valve 16. (In the description mentioned above, the upstream side and the downstream side are called in an air flow direction.)

In this case, the intake passage 15b at the upstream side communicate with an air cleaner (not shown) by an air pipe, the intake passage 15a at the downstream side communicate with an engine (not shown) by an intake pipe, and a fuel controlled by a fuel injection valve (not shown) is injected and supplied into the intake passage 15 or the intake pipe.

Reference symbol M denotes a motor such as a step motor or the like in which an output shaft Ma protrudes toward a lower side. A motor case Mb formed by a synthetic resin material is out molded in an outer periphery of the motor M, and a tube portion Mc surrounding the output shaft Ma is formed in the motor case Mb so as to be open toward a lower side. Reference numeral 17 denotes a rotation suppressing member formed in a tubular shape. A rotation suppressing groove 17b is provided in an inner peripheral wall 17a thereof in a vertical direction in the drawing, and the rotation suppressing member 17 is inserted into the tube portion Mc from a lower opening of the tube portion Mc so as to be fixed. For example, it is light pressure inserted.

In accordance with the structure mentioned above, the rotation suppressing member 17 is fixedly arranged in an inner side of the tube portion Mc of the motor case Mb provided with the motor M, and the output shaft Ma is arranged in an inner side of the inner peripheral wall 17a of the rotation suppressing member 17. The motor case Mb is structured such that a U-shaped groove of a tabular attaching member 18 is fitted to an inner side of an annular groove Md provided in an outer periphery of the tube portion Mc as well as a lower side of the tube portion Mc is inserted into the motor insertion hole 11 of the air control valve main body 10, and the attaching member 18 is fixed by screw to the air control valve main body 10 via a screw 19 as well as being arranged on an upper end surface 10a of the air control valve main body 10 in a contact manner.

Reference numeral 20 denotes a slider screwed to a male thread formed on an outer periphery of the output shaft Ma. The slider 20 is formed by an annular collar portion 20a and a shaft portion 20b protruding toward a lower side from the annular collar portion 20a, and a protruding portion 20c inserted into the rotation suppressing groove 17b of the rotation suppressing member 17 is integrally formed at a part of an outer periphery of the annular collar portion 20a so as to protrude sideward.

In accordance with the structure mentioned above, when the output shaft Ma is rotated in synchronization with the motor M, the rotation of the slider 20 is suppressed by the protruding portion 20c and the rotation suppressing groove 17b, whereby the slider 20 is moved up and down in the drawing in correspondence to the rotating direction of the motor M.

Reference numeral 21 denotes an air control valve arranged within the valve body guide hole 12 so as to be movable in a vertical direction, and is formed in a closed-end tubular shape in which a tube portion 21b is integrally formed from a bottom portion 21a toward an upper side.

The air control valve 21 mentioned above is arranged so as to face to an outer periphery 20d of the shaft portion 20b of the slider 20, and a bottom portion 21a thereof is arranged on an E clip 22 fixedly arranged so as to be fitted to a lower end of the shaft portion 20b of the slider 20 in such a manner as to be brought into contact by a spring 23. In other words, a contracted spring 23 is arranged in a space portion 25 formed between an inner side of the tube portion 21b and the outer periphery 20d of the shaft portion 20b, one end 23a of the spring 23 is locked to a lower surface of the annular collar portion 20a of the slider 20, and the other end 23b is locked to the bottom portion 21a of the air control valve 21. Accordingly, the bottom portion 21a of the air control valve 21 is elastically held so as to be pressed toward the E clip 22.

In accordance with the air bypass apparatus structured as mentioned above, when the motor M including the output shaft Ma is rotated in one direction, the rotation of the slider 20 is suppressed by the rotation suppressing groove 17b and the protruding portion 20c, thereby being moved, for example, in a downward direction in the drawing. Further, since the air control valve 21 is also synchronously moved in the downward direction on the basis of the downward movement of the slider 20, it is possible to control an opening area of the air control hole 13 in a reducing direction by the air control valve 21, and it is possible to regulate and control an amount of idle air supplied to the intake passage 15a at the downstream side in the reducing direction.

Further, when the motor M including the output shaft Ma is rotated in the other direction, the slider 20 is moved in an upward direction in the drawing.

Further, since the air control valve 21 is also synchronously moved in the upward direction on the basis of the upward movement of the slider 20, it is possible to control the opening area of the air control hole 13 in an increasing direction by the air control valve 21, and it is possible to regulate and control the amount of the idle air supplied to the intake passage 15a at the downstream side in the increasing direction, whereby it is possible to supply a desired amount of the idle air toward the engine.

SUMMARY OF THE INVENTION

Problem to be Solved by the Invention

In accordance with the conventional air bypass apparatus mentioned above, it is hard to maintain reproducibility of the idle air amount at an extremely high precision.

This is because of the following reasons. First, a first annular gap S1 is formed between the outer periphery of the air control valve 21 and the valve body guide hole 12, and a second annular gap S2 is formed between an inner periphery 21a1 of a bottom portion 21a of the air control valve 21 and the outer periphery 20d of the shaft portion 20b of the slider 20.

In this case, the annular gaps S1 and S2 are necessary for arranging the air control valve 21 in the valve body guide hole 12 so as to be smoothly movable while taking into consideration a manufacturing error and an assembling error of the air control valve 21, the slider 20, the valve body guide hole 12 and the like.

Further, since the bottom portion 21a of the air control valve 21 is arranged in a contact manner on the E clip 22 fitted to the outer periphery 20d of the shaft portion 20b of the slider 20 so as to be fixedly arranged, the space portion 25 formed between the inner side of the tube portion 21b of the air control valve 21 and the outer periphery 20d of the shaft portion 20b of the slider 20 communicates toward the bottom portion 12b of the valve body guide hole 12 via the second annular gap S2, and the notch grooves 22a1, 22a2 and 22a3 formed in the E clip 22.

The notch grooves 22a1, 22a2 and 22a3 of the E clip mentioned above are disclosed in FIG. 8, and a hatched portion by a one-dot chain line in FIG. 9 corresponds to a portion where the second annular gap S2 communicates with the notch grooves 22a1, 22a2 and 22a3. The notch grooves 22a1, 22a2 and 22a3 mentioned above are open so as to face to the bottom portion 12b of the valve body guide hole 12.

When the engine is operated in this case, pulsative pressure is generated within the intake passage 15, and the pulsative pressure is applied to the inner side of the valve body guide hole 12 from the air inflow hole 17 and the bottom portion 12b. Further, the pulsative pressure within the valve body guide hole 12 is applied to the space portion 25 at the inner side of the air control valve 21 from the notch grooves 22a1, 22a2 and 22a3 of the E clip 22 via the second annular gap S2.

In accordance with the structure mentioned above, there is a case that the air control valve 21 moves to the side portion (a direction orthogonal to a longitudinal axis X-X of the valve body guide hole 12) slightly in a state in which the lower surface of the bottom portion 21a is brought into contact with the upper end surface of the E clip 22, whereby there is generated dispersion in the set idle air amount even in a state in which the opening degree of the air control valve 21 is held constant (a stroke state in a vertical direction of the air control valve 21 is constant).

In other words, if the air control valve 21 is moved to a right side in FIG. 8, the gap S1a formed between the air control valve 21 and the valve body guide hole 12 is reduced, at the side in which the air control hole 13 is open. Accordingly, a resistance of an air flow flowing into the air control hole 13 becomes large, and the idle air amount controlled by the air control hole is changed slightly toward reduction.

On the other hand, if the air control valve 21 is moved to a left side, the gap S1a is increased. Accordingly, the resistance of the air flow flowing into the air control hole 13 becomes small, and the idle air amount controlled by the air control hole 13 is changed slightly toward increment.

Accordingly, there is generated dispersion in the idle air amount controlled by the air control hole 13 even in the state in which the opening degree of the air control valve 21 is set to the fixed opening degree, and it is hard to reproduce the idle air amount at high precision.

On the other hand, in order to solve the problem mentioned above, it is considered to increase dimensional accuracy of the valve body guide hole 12 and the air control valve 21 and make the gaps S1 and S2 smaller. However, in this case, working man hours and assembling man hours are largely increased so as to cause an increase of the manufacturing cost.

Further, there is generated a problem such as necessity to increase a maintenance frequency against foreign materials making intrusion into the gap S1 between the air control valve 21 and the valve body guide hole 12. Further, it is also considered to integrally form the slider 20 and the air control valve 21. However, this causes an increase of the manufacturing cost and is not preferable.

The present invention is made by taking the problem mentioned above into consideration, and an object of the present invention is to provide an air bypass apparatus which can accurately supply an idle air amount without being affected by a pulsative pressure generated within an intake passage in a state in which an opening degree of an air control valve is fixed, and to provide an air bypass apparatus having a high reproducibility of an idle air amount.

Means for Solving the Problem

In order to achieve the object mentioned above, in accordance with a first aspect of the present invention, there is provided an air bypass apparatus in a fuel injection apparatus comprising:

a valve body guide hole provided in an air control valve main body, in which an air control hole connected to an intake passage at a downstream side of a throttle valve is open at a side wall of the valve body guide hole, and an air inflow hole connected to an intake passage at an upstream side of the throttle valve is open at a lower side of the valve body guide hole;

a slider screwed to an output shaft of a motor M, in which a linear movement along a longitudinal axis of the valve body guide hole is allowed, and a rotation thereof is inhibited; and an air control valve formed n a closed-end tubular shape, in which an outer periphery in a tubular portion of the air control valve is arranged on a side wall of the valve body guide hole with a gap, an inner periphery of a bottom portion of the air control valve is arranged on an outer periphery of a shaft portion of the slider with a gap, an inner side of the tube portion is provided with a contracted spring, one end of which is locked to the slider and the other end of which is locked to the bottom portion, and a bottom portion of the air control valve is arranged so as to be pressed by a locking piece portion attached to the shaft portion of the slider, the opening of the air control hole being controlled by the air control valve moving in correspondence to the rotation of the motor M, wherein a closing member closing an annular gap formed between the inner periphery of the bottom portion of the air control valve and the outer periphery of the shaft portion of the slider is arranged in a contact manner on a lower end surface of the bottom portion of the air control valve.

Further, in accordance with a second aspect of the present invention, in addition to the first aspect, the closing member is constituted by a flat washer, the flat washer is arranged so as to be fitted on the outer periphery of the shaft portion of the slider and is arranged in a contact manner on the lower end surface of the bottom portion of the air control valve by an E clip fixedly attached to the lower end of the shaft portion, and the annular gap is closed by an upper side surface of the flat washer.

Further, in accordance with a third aspect of the present invention, in addition to the first aspect, a plurality of the air control holes are open at positions on the side wall in same height from a bottom portion of the valve body guide hole, and each of the air control holes communicates with the intake passage at the downstream side of the throttle valve in each of the throttle bodies constituting a multiple throttle body system.

EFFECT OF THE INVENTION

In accordance with the first aspect of the present invention, the annular gap formed between the inner periphery of the bottom portion of the air control valve and the outer periphery of the shaft portion of the slider is closed by the closing member arranged in a contact manner on the lower end surface of the bottom portion of the air control valve.

In accordance with the structure mentioned above, even if the pulsative pressure generated within the intake passage is applied to the inner side of the bottom portion of the valve body guide hole via the air inflow hole, the pulsative pressure is not applied to the space portion formed between the inner side of the tube portion of the air control valve and the outer periphery of the shaft portion of the slider via the gap.

Accordingly, the air control valve is not moved in the direction orthogonal to the longitudinal axis of the valve body guide hole, whereby it is possible to supply the idle air accurately and with high reproducibility.

Further, since the closing member is arranged on the lower end surface of the bottom portion of the air control valve, the air control valve can be inserted in such a manner as to be guided by the valve body guide hole at a time of inserting the air control valve into the valve body guide hole so as to assemble them. Accordingly, an assembling characteristic of the air control valve into the valve body guide hole is not obstructed.

Further, since the same gap as the conventional gap can be used for the first gap between the outer periphery of the tube portion of the air control valve and the valve body guide hole, and the second gap between the inner periphery of the bottom portion of the air control valve and the outer periphery of the shaft portion of the slider, the working man hours and the assembling man hours are not increased.

Further, in accordance with the second aspect of the present invention, since the flat washer is used as the closing member, it is possible to inhibit an increase of a part unit cost. Further, since the conventionally used E clip is used as the locking piece portion, it is possible to utilize the conventional part and the conventional fitting jig, and it is possible to hold down an increase of the manufacturing cost.

Further, since the flat washer is used, it is possible to reduce an increase of a length in the direction of the longitudinal axis of the valve body guide hole, and it is possible to obtain compatibility with the conventional structure.

Further, in accordance with the third aspect of the present invention, since a plurality of air control holes are open at the side wall of the valve body guide hole, and the gap between the valve body guide hole and the outer periphery of the tube portion of the air control valve is always held in the constant state, it is possible to provide the idle air particularly having high reproducibility toward each of the intake passages of the multiple throttle body system.

DETAILED DESCRIPTION OF PREFERRED EMBODIMENT

A description will be given below of an embodiment of an air bypass apparatus in a fuel injection apparatus in accordance with the present invention with reference to the accompanying drawings.

Figure 1:
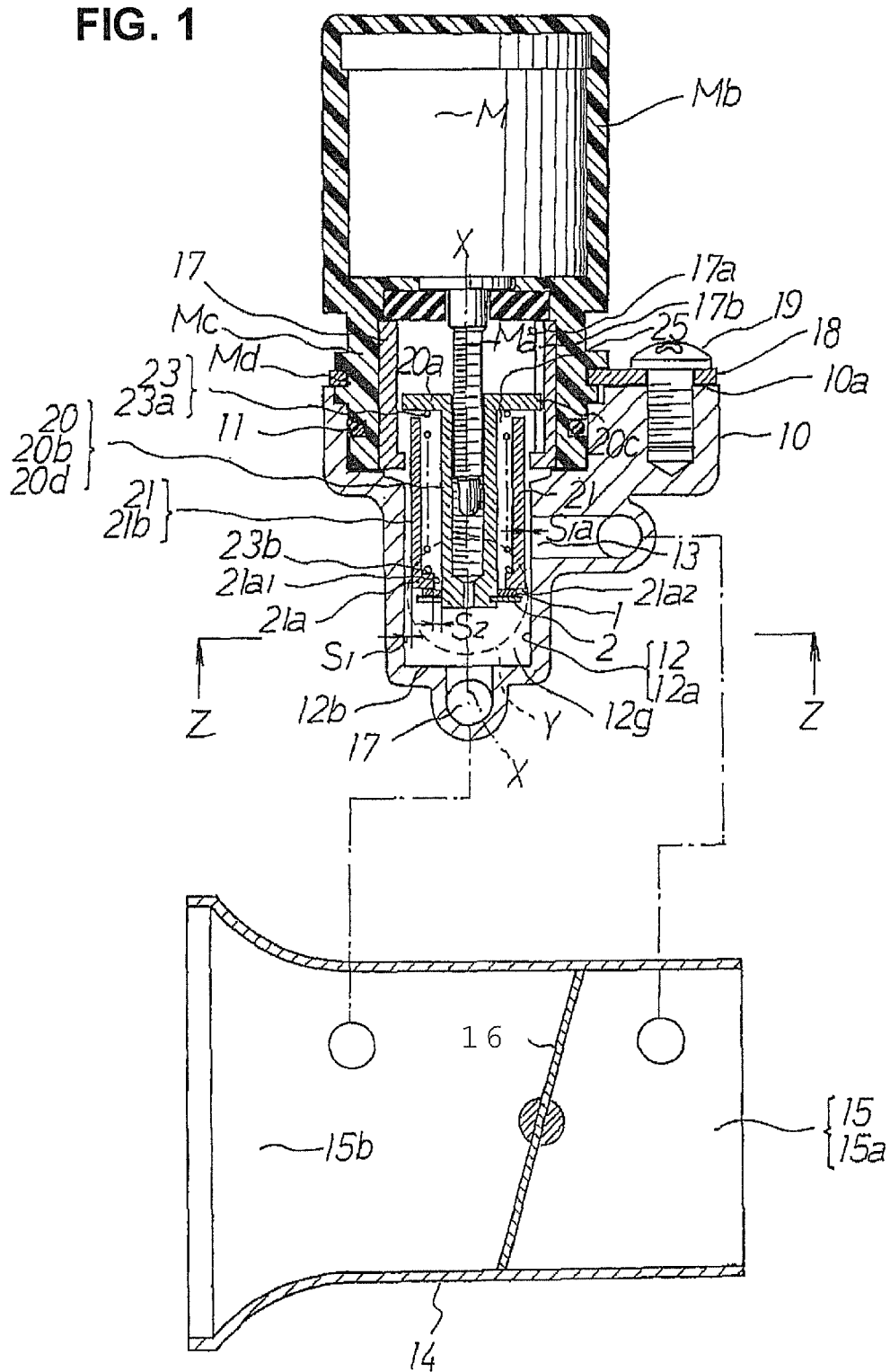
FIG. 1 is a vertical sectional view of a main portion showing a first embodiment of an air bypass apparatus in a fuel injection apparatus in accordance with the present invention.
Figure 2:
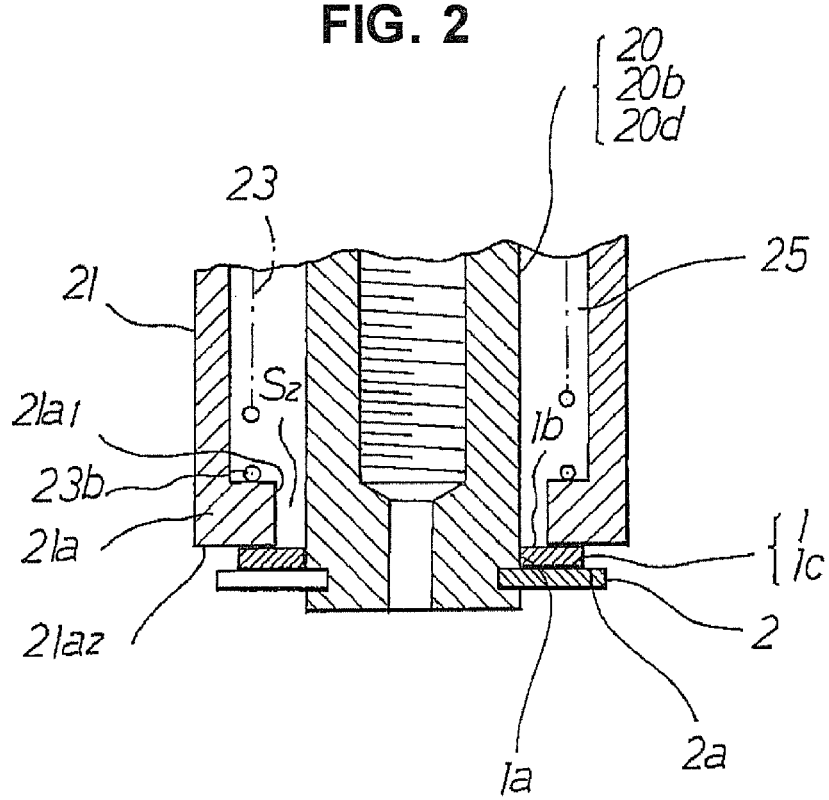
FIG. 2 is an enlarged view of a portion Y in FIG. 1.
Figure 3:
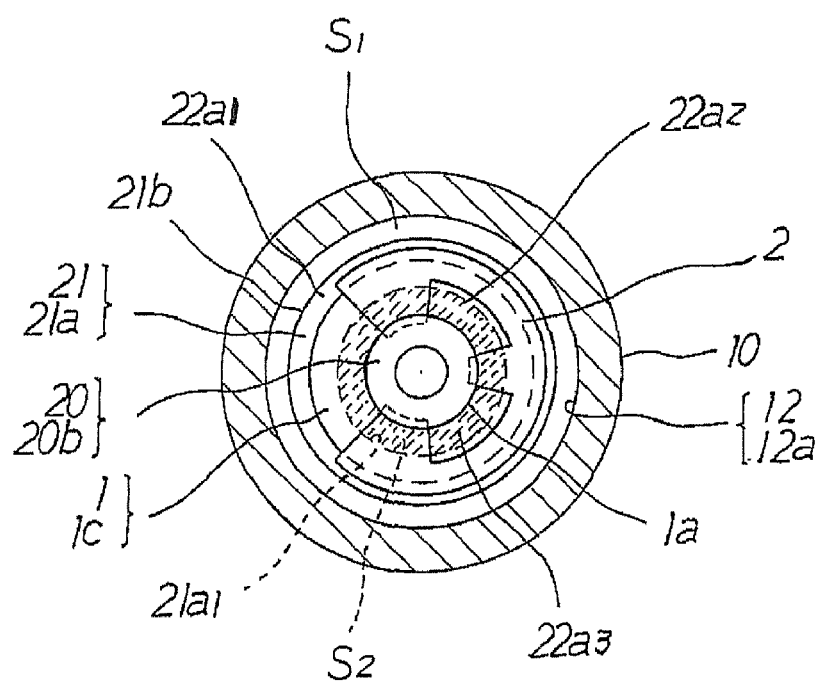
FIG. 3 is a cross sectional view of a main portion along a line Z-Z in FIG. 1.

FIG. 1 is a vertical sectional view of a main portion, FIG. 2 is an enlarged view of a portion Y in FIG. 1, and FIG. 3 is a cross sectional view along a line Z-Z in FIG. 1.

Figure 8:
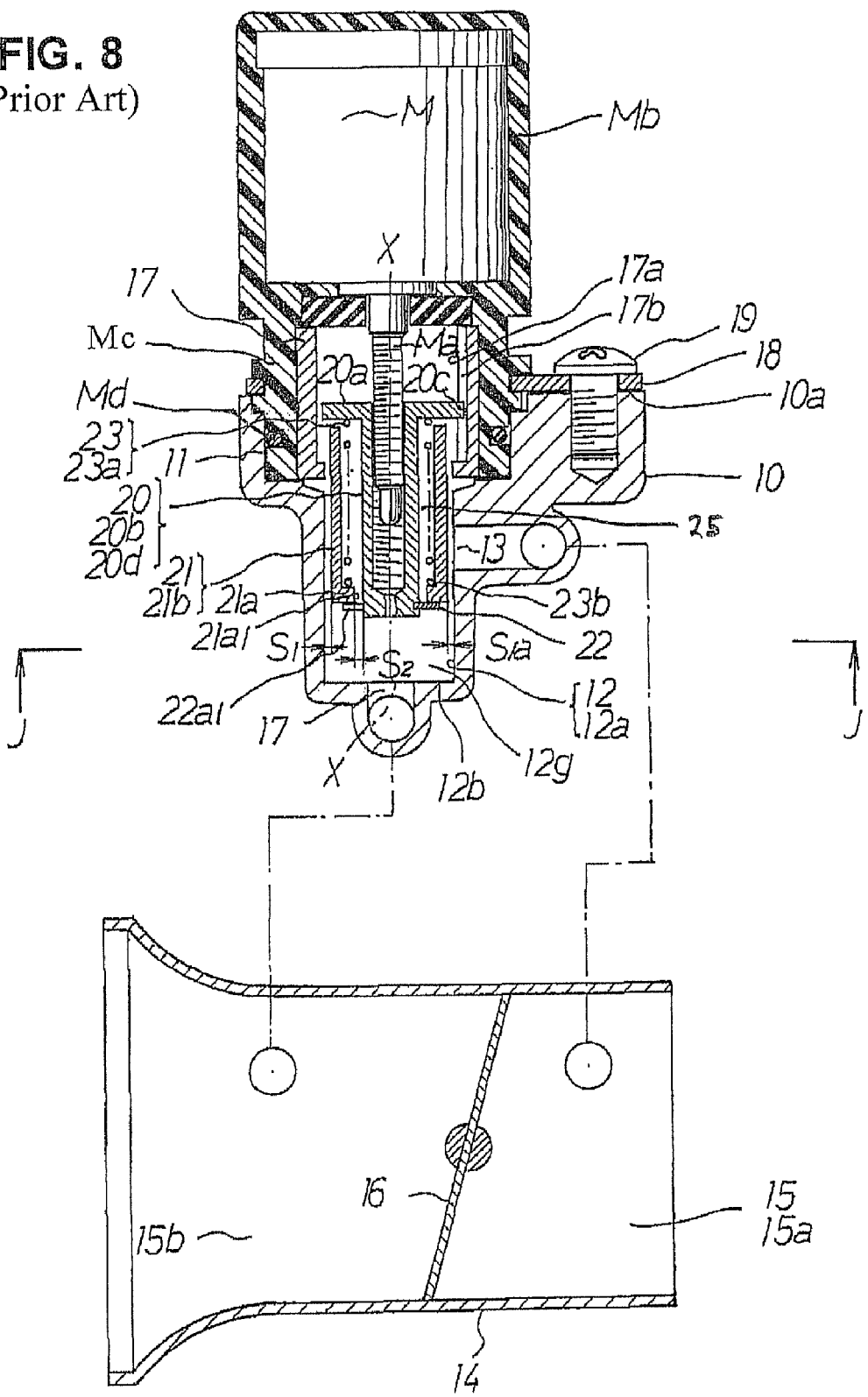
FIG. 8 is a vertical sectional view of a main portion showing a conventional air bypass apparatus.
Figure 9:
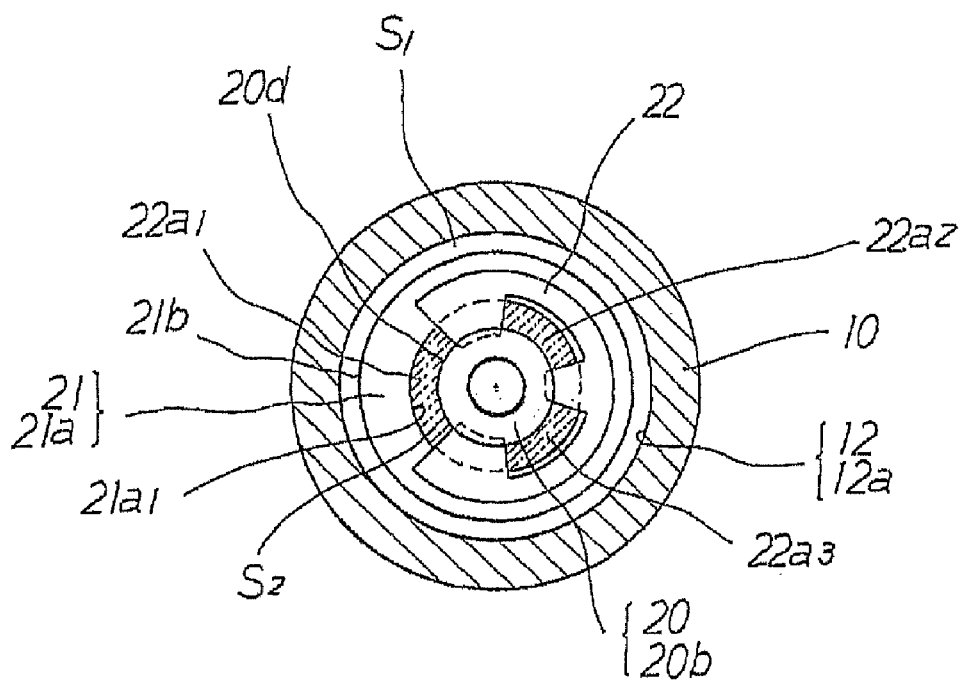
FIG. 9 is a cross sectional view of a main portion in a line J-J in FIG. 8.

In this case, the same reference numerals are used in the same structural portions as in FIG. 8 and a description thereof will be omitted.

Reference numeral 1 denotes a closing member arranged between a locking piece portion 2 such as, for example, an E clip fixedly attached to a lower end of a shaft portion 20b of a slider 20, and a lower end surface 21a2 of a bottom portion 21a of an air control valve 21. Specifically, the closing member 1 has a flat shape, and is formed by an insertion hole 1a fitted on an outer periphery 20d of the shaft portion 20b with a small gap, an upper side surface 1b formed as a flat surface brought into contact with the lower end surface 21a2 of the bottom portion 21a of the air control valve 21, and a lower side surface 1c formed as a flat surface brought into contact with an upper side surface 2a of the locking piece portion 2.

In accordance with the structure mentioned above, the air control valve 21 is pressed in a downward direction in the drawing by a spring 23, the lower end surface 21a2 of the bottom portion 21a of the air control valve 21 is brought into contact with the upper side surface 1b of the closing member 1, and the lower side surface 1c of the closing member 1 is elastically pressed to the upper side surface 2a of the locking piece portion 2 so as to be arranged in a contact manner. In accordance with the structure mentioned above, a second gap S2 formed between the inner periphery 21a1 of the bottom portion 21a of the air control valve 21 and the outer periphery 20d of the shaft portion 20b of the slider 20 is closed by the closing member 1.

In other words, communication between a space portion 25, which is formed between an inner side of the tube portion 21b of the air control valve 21 and the outer periphery 20d of the shaft portion 20b of the slider 20, and a lower chamber 12g of the valve body guide hole 12, which faces to the bottom portion 21a of the air control valve 21 and includes the bottom portion 12b, is cut off.

In accordance with the bypass apparatus of the present invention, even when a pulsative pressure generated within an intake passage 15 is applied to the lower chamber 12g of the valve body guide hole 12 via an air inflow hole 17 during operation of an engine, the pulsation pressure is shut off by the closing member 1. Accordingly, the pulsative pressure is not applied to the space portion 25 formed between the inner side of the tube portion 21b of the air control valve 21 and the outer periphery 20d of the shaft portion 20b of the slider 20.

FIG. 3 shows a state in which the second annular gap S2 shown by a one-dot chain line is closed by the closing member 1.

As mentioned above, since the closing member 1 prevents the pulsative pressure generated within the intake passage 15 from being applied to the space portion 25, the air control valve 21 does not move in the direction orthogonal to a longitudinal axis X-X of the valve body guide hole 12, it is possible to always arrange the air control valve 21 within the valve body guide hole 12 in an initially set state, and it is possible to always hold a gap S1a between the valve body guide hole 12 where the air control hole 13 opens and the tube portion 21b of the air control valve 21 facing thereto to be constant.

Accordingly, it is possible to accurately supply the initially set idle air into the intake passage 15 through the air control hole 13, and it is possible to obtain good reproducibility.

Further, since the closing member 1 is arranged in a contact manner on the lower end surface 21a2 of the bottom portion 21a of the air control valve 21, the air control valve 21 can be inserted into the valve body guide hole 12 in such a manner as to be guided by the valve body guide hole 12 at a time of inserting the air control valve 21 into the valve body guide hole 12. Accordingly, an assembling characteristic of the air control valve 21 with respect to the valve body guide hole 12 is not obstructed.

Further, since the flat washer is used as the closing member 1, and the E clip is used as the locking piece portion 2, both of the flat washer and the E clip can be generally available parts in the market, and it is possible to prevent a part cost from being increased.

Further, since the flat washer is arranged so as to be fitted on the outer periphery 20d of the shaft portion 20b of the slider, and the E clip is fixedly attached to the outer periphery of the lower end of the shaft portion 20b of the slider, it is possible to utilize the conventional E clip fitting jig as it is, and it is possible to prevent an assembling cost from being increased.

Further, since the flat washer is used, it is possible to prevent a length in the longitudinal axis direction X-X of the valve body guide hole 12 from being increased.

Figure 4:
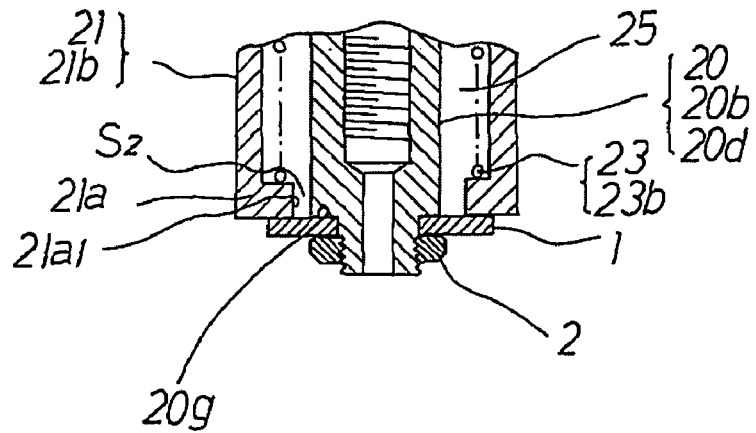
FIG. 4 is a vertical sectional view of a main portion showing a second embodiment of a locking piece portion in accordance with the present invention.
Figure 5:
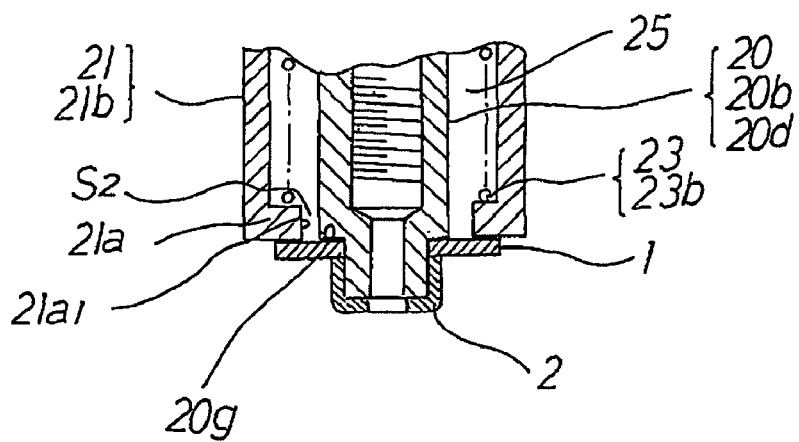
FIG. 5 is a vertical sectional view of a main portion showing a third embodiment of the locking piece portion in accordance with the present invention.
Figure 6:
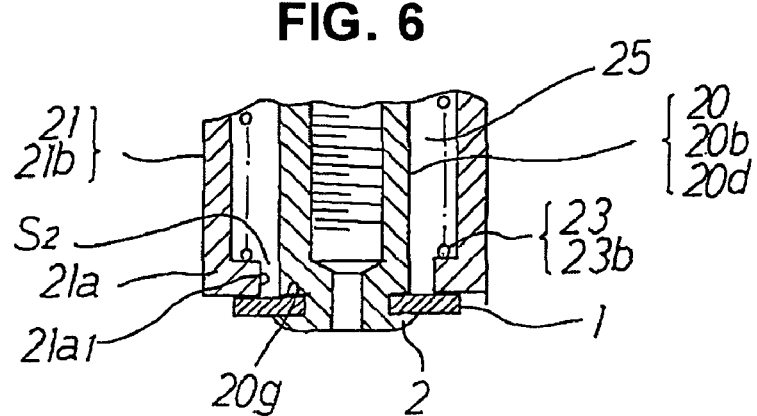
FIG. 6 is a vertical sectional view of a main portion showing a fourth embodiment of the locking piece portion in accordance with the present invention.

In addition, other embodiments of the locking piece portion 2 is shown in FIGS. 4, 5 and 6. FIG. 4 shows a structure in which a nut is used as the locking piece portion 2, and the closing member 1 is screwed toward a locking step portion 20g formed on the lower end of the shaft portion 20b of the slider. Further, FIG. 5 shows a structure in which a cap is used as the locking piece portion 2, and the cap is pressure inserted toward the locking step portion 20g of the shaft portion 20b of the slider. Further, FIG. 6 shows a structure in which the lower end surface of the shaft portion 20b of the slider is caulked by rolling toward the locking step portion 20g.

Figure 7:
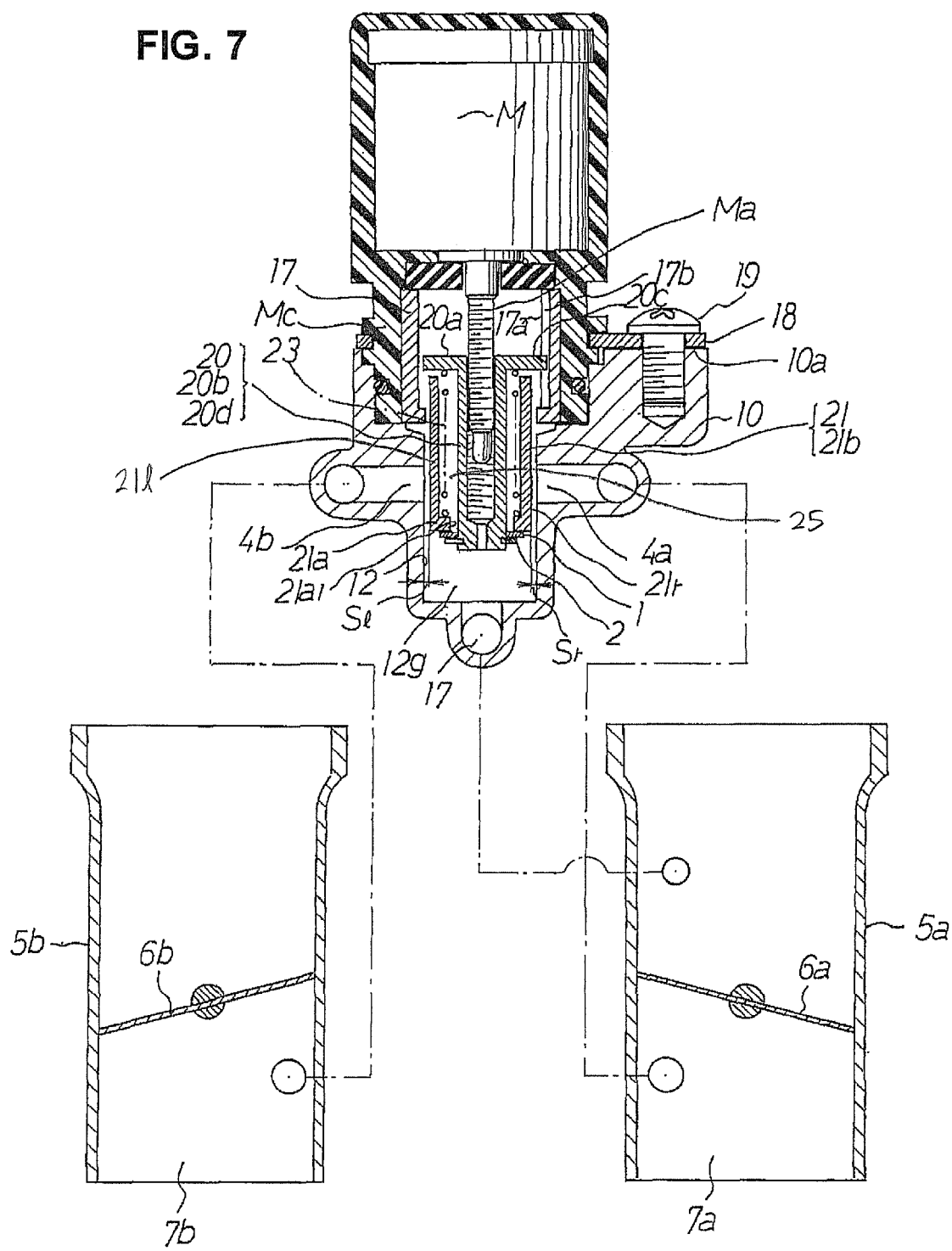
FIG. 7 is a vertical sectional view of a main portion showing a second embodiment of the air bypass apparatus in the fuel injection apparatus in accordance with the present invention.

FIG. 7 shows another embodiment in accordance with the present invention, and a description will be given of a different part from FIG. 1.

A plurality of air control holes are provided at positions on the side wall 12a in same height from the bottom portion 12b of the valve body guide hole 12.

In the present embodiment, two holes are provided, a first air control hole 4a communicates with an intake passage 7a at a downstream side of a throttle valve 6a in a first throttle body 5a, and a second air control hole 4b communicates with an intake passage 7b at a downstream side of a throttle valve 6b in a second throttle body 5b.

In accordance with the structure mentioned above, since the pulsative pressure generated within the intake passage in the same manner as the first embodiment shown in FIG. 1 is prevented from moving forward into the space portion 25 by the closing member 1, it is possible to always hold a gap Sr between a right side wall 21r of the air control valve 21 and the valve body guide hole 12 where the first air control hole 4a opens, and a gap S1 between a left side wall 21e of the air control valve 21 and the valve body guide hole 12 where the second air control hole 4b opens, to be constant, whereby it is possible to supply the idle air to each of the intake passages 7a and 7b from the first air control hole 4a and the second air control hole 4b accurately and with high reproducibility. The structure is particularly preferable as an air bypass apparatus in a multiple throttle body system.

What is claimed is:

1. An air bypass apparatus in a fuel injection apparatus comprising:

a valve body guide hole provided in an air control valve main body, in which an air control hole connected to an intake passage at a downstream side of a throttle valve is open at a side wall of the valve body guide hole, and an air inflow hole connected to the intake passage at an upstream side of the throttle valve is open at a lower side of the valve body guide hole;

a slider screwed to an output shaft of a motor, in which a linear movement along a longitudinal axis of the valve body guide hole is allowed, and a rotation thereof is inhibited; and an air control valve formed in a closed-end tubular shape, in which an outer periphery in a tube portion of the air control valve is arranged on a side wall of the valve body guide hole with a gap, an inner periphery of a bottom portion of the air control valve is arranged on an outer periphery of a shaft portion of the slider with a gap, and an inner side of the tube portion is provided with a contracted spring, one end of which is locked to the slider and the other end of which is locked to the bottom portion, and the bottom portion of the air control valve is arranged so as to be pressed by a locking piece portion attached to the shaft portion of the slider, the opening of the air control hole being controlled by the air control valve moving in correspondence to the rotation of the motor, wherein a closing member closing an annular gap, which is formed between the inner periphery of the bottom portion of the air control valve and the outer periphery of the shaft portion of the slider, has an entire circumference of the closing member arranged in a contact manner on a lower end surface of the bottom portion of the air control valve for completely closing the annular gap.

2. An air bypass apparatus in a fuel injection apparatus as claimed in claim 1, wherein said closing member is constituted by a flat washer, the flat washer is arranged so as to be fitted on the outer periphery of the shaft portion of the slider and is arranged in a contact manner on the lower end surface of the bottom portion of the air control valve by a locking piece portion fixedly attached to the lower end of the shaft portion, and said annular gap is closed by an upper side surface of the flat washer.

3. An air bypass apparatus in a fuel injection apparatus as claimed in claim 1, wherein a plurality of said air control holes are at positions on the side wall in same height from a bottom portion of the valve body guide hole, and each of the air control holes communicates with the intake passage at the downstream side of the throttle valve in each of the throttle bodies constituting a multiple throttle body system.

* * * * *